Feb. 17, 1925.
W. FOURNESS
1,526,907
PROCESS OF MAKING GASOLINE FROM CRUDE MINERAL OIL
Filed April 20, 1920      2 Sheets-Sheet 1
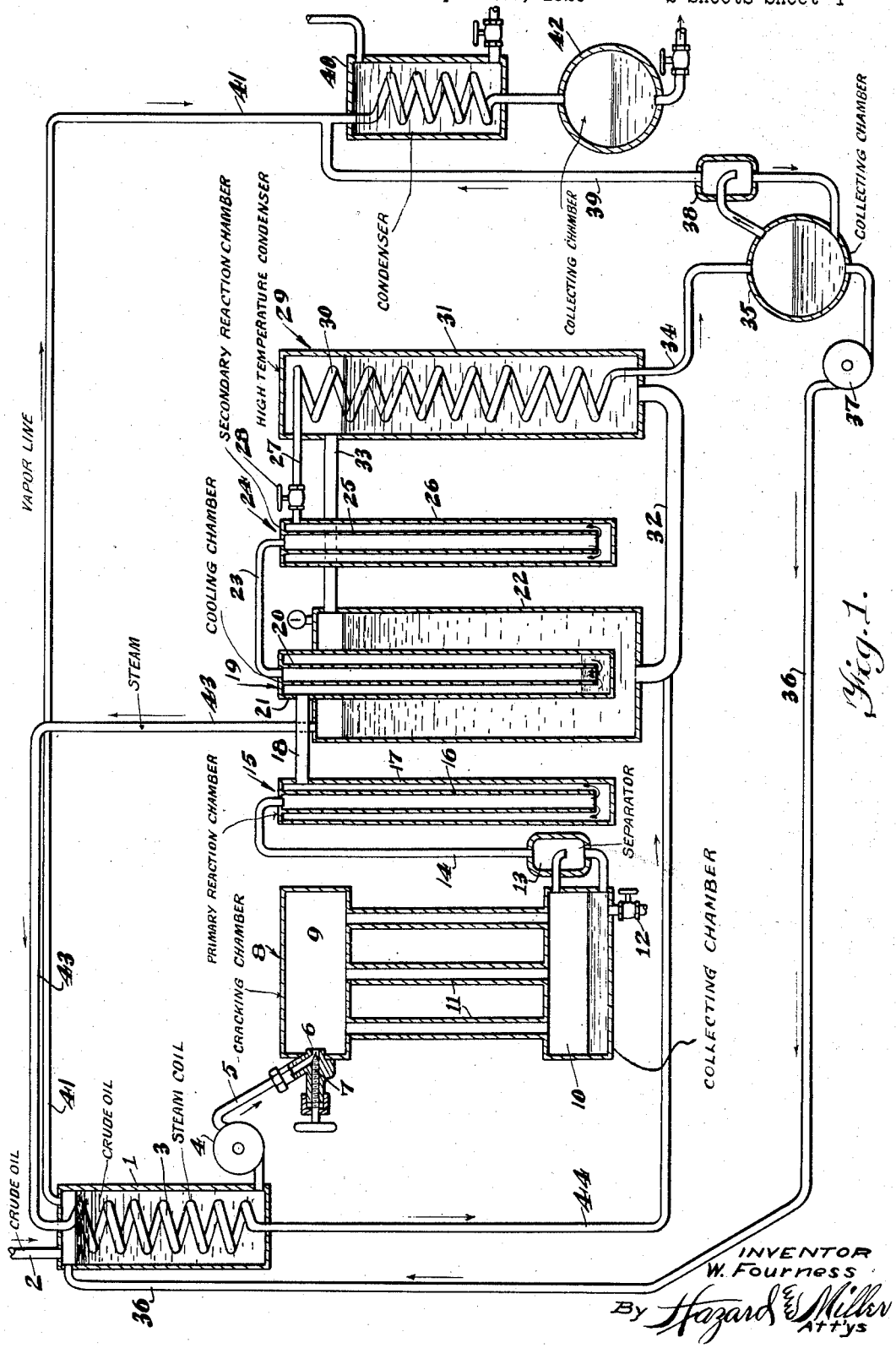

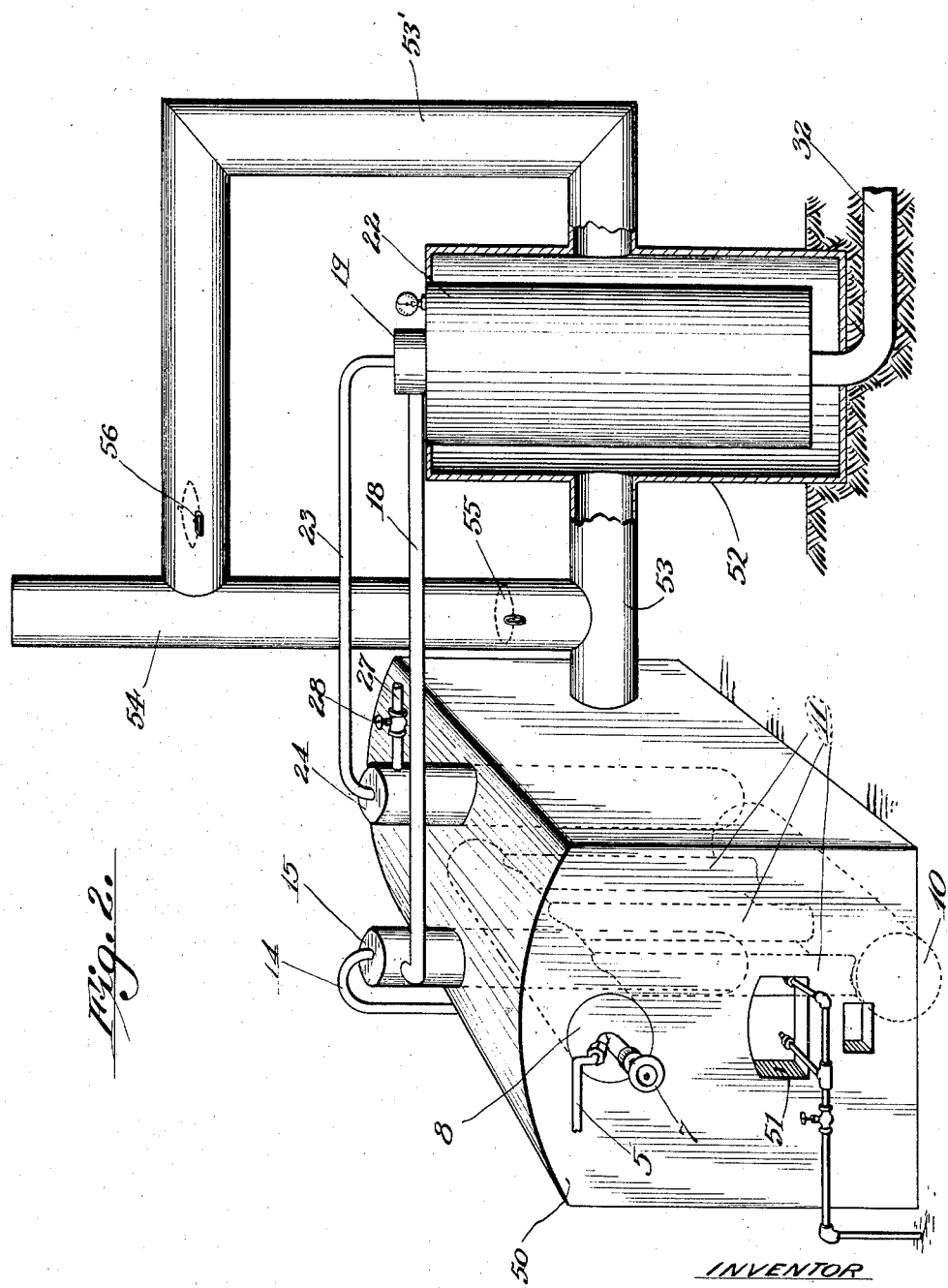

Patented Feb. 17, 1925.

1,526,907

UNITED STATES PATENT OFFICE.

WILFRED FOURNESS, OF PASADENA, CALIFORNIA, ASSIGNOR OF TWO-THIRDS TO S. HAZARD HALSTED, EZRA S. GOSNEY, AND GUY R. McCOMB, ALL OF PASADENA, CALIFORNIA.

PROCESS OF MAKING GASOLINE FROM CRUDE MINERAL OIL.

Application filed April 20, 1920. Serial No. 375,368.

*To all whom it may concern:*

Be it known that I, WILFRED FOURNESS, a citizen of the United States, residing at Pasadena, in the county of Los Angeles and State of California, have invented new and useful Improvements in Processes of Making Gasoline from Crude Mineral Oil, of which the following is a specification.

My invention relates to a process of making gasoline from crude oil. It is an object of this invention to devise an improved process of treating crude mineral oil whereby an increased yield of gasoline is obtained without the use of excessive temperatures or pressures. The main feature of the invention consists in the step of cooling the vapors and gases coming from the cracking zone and causing the gases and vapors to come in contact with the condensed heavy fractions in the cooling zone and then again subjecting the gases and vapors coming from the cooling zone and charged with the heavy fractions to the temperature of the cracking zone. By this method I have been able to produce as much as 52% of a distillate having a gravity of 57.4 Bé. from a topped mineral oil of 28° Bé.

My invention consists of the steps of the process hereinafter described and claimed.

In the accompanying drawings—

Figure 1 is a diagrammatic view of the apparatus suitable for carrying out my process, and Fig. 2 is a view in perspective showing the means employed for heating the several units of the apparatus.

Referring to the drawings, 1 indicates the crude oil vessel which is supplied by inlet pipe 2 with crude oil. 3 is a steam coil disposed in the crude oil vessel 1 for preheating the oil, preferably up to a temperature of 200 to 400° F. A pump 4 pumps the oil from the vessel 1 under a pressure of 175 to 200 lb. pressure through a pipe 5 to an inlet port 6 controlled by a valve 7 to a vaporizing and cracking chamber 8 which is here shown as consisting of an upper vaporizing chamber 9 and a lower collecting chamber 10, the two chambers being connected by vertical cracking pipes 11. The vaporizing and cracking chamber 8 is heated by any suitable means such as a furnace 50 provided with suitable burners 51 to a temperature of 600° to 1000° F. The residue collects in the collecting chamber 10 which is provided with a valved outlet 12 while the vapors pass through the separator 13 and a vapor line 14 to a primary re-action chamber 15 vertically disposed in furnace 50 and which consists of a central tube 16 open at its lower end and disposed concentrically within a closed outer tube 17. The vapors pass from the inner tube 16 into the outer tube 17 and out through a vapor line 18 to a cooling or tempering chamber 19. The primary re-action chamber 15 is subjected to the same temperature as the vaporizing and cracking chamber 8, namely, from 600° to 1000° F. The heavier fractions of the vapors, as the latter pass through the primary re-action chamber 15, are broken down into lighter hydro-carbons, at least in part.

The tempering or cooling chamber 19 consists of a vertical pipe 20 open at its lower end and surrounded by an outer tube 21 closed at both ends. More than one half of the cooling and tempering chamber 19 is disposed in a boiler 22 heated to a temperature of 200° to 400° F. The heat to the boiler 22 is supplied by means of a closed drum 52 in which the boiler 22 is disposed. A waste gas flue 53 leads from the furnace 50 to the drum 52, the main flue stack 54 rising vertically from the flue 53 and is controlled by a damper 55. Leading from the drum 52 is a waste gas flue 53' which communicates with the main stack 54 and is controlled by a damper 56. As shown in Fig. 2, the dampers are in position to cause all the hot waste gases from the furnace 50 to pass into the drum 52, thence through the flue 53' to the main stack 54. By manipulating the dampers 55 and 56 any desired part of the hot waste gases may be directed to the drum 52, thus controlling the temperature therein. The drop of temperature to which the vapors are subjected after coming highly heated from the reaction zone will cause the heavier fractions of the mixed vaporous products initially and partially to condense and collect in the lower part of the tempering or cooling chamber 19, which will act temporarily as a liquid seal therein; and additional or subsequent quantities of vaporous products, in passing downwardly in the outer tube 21, will press upon the liquid so initially condensed, thereby entraining portions of the same in passing up through the inner tube 20, from the top of which a vapor and oil mixture containing unduly light fractions absorbed in unduly heavy fractions will pass through a vapor line 23 into a secondary re-action chamber 24 disposed in furnace 50, constructed like the first reaction chamber 15 and consisting of an inner tube 25 open at the lower end and surrounded by a closed outer tube 26. The resultant vaporous mixtures are, in this secondary reaction zone, again subjected to a temperature of 600° to 1000° F., the formation of additional quantities of unduly light products being restrained by the presence of such light products as were previously formed and not recombined into forms marketable as gasoline, it being understood that when equilibrium is reached in any intermediate cooling chamber there may be an extremely rapid fluctuation between the liquid and vapor phases, the bulk supply of condensate remaining practically constant, for any given temperature and pressure, and the conditions being favorable to a reabsorption and recombination tending to inhibit the formation of fixed gases.

In the secondary reaction chamber the vapors of the unchanged or insufficiently cracked heavier fractions are broken down into lighter hydro-carbons, when they pass through a vapor line 27 provided with a regulating valve 28 to a high temperature condenser 29, the vapors passing through a coil of pipe 30 disposed in the chamber 31 filled with water. The chamber 31 is in communication with the cooling chamber 22 by means of a pipe 32 connecting their lower ends. A pipe 33 connects the upper ends of the chambers 22 and 31.

The condensed and uncondensed distillates together leave the high temperature condenser 29 by a pipe 34 and enter a vessel 35 where the heavier fractions are collected and may be returned, by means such as pipe 36 and pump 37, to the crude oil vessel 1 to enter another cycle of operation.

The still uncondensed vapors of lighter hydro-carbons pass from the vessel 35 through a separator 38 and vapor line 39 to a suitable condenser 40, the vapor line 39 being joined by a vapor line 41 leading from the upper part of the crude oil vessel 1; and the mixture of the vapors is condensed in the usual manner in the condenser 40. 42 is a collecting vessel for the lighter and valuable distillates.

The steam coil 3 in the crude oil vessel 1 communicates by means of pipe 43 with the top of the cooling chamber 22, which thus supplies the steam to the steam coil 3; and the lower end of the steam coil 3 is connected by means of a pipe 44 to the pipe 32, which thus serves to return the condensed steam from the steam coil 3.

In the operation of my process the preheated mineral oil is supplied to the vaporizing and cracking chamber 8, the vapors passing through the primary reaction chamber 15, thence to the cooling and tempering chamber 19, as explained above. This is an important step of the process. From the vapors, which were heated in the cracking zone to a temperature of from 600° to 1000° F., the heavier fractions are at least momentarily condensed in the cooling chamber, so that the uncondensed vapors are there caused to entrain the condensed heavier fractions, and the consequent intimate mixture is again heated in the secondary re-action chamber 24 to a high temperature, thereby effecting an additional cracking of the remaining heavier fractions and increasing greatly the yield of gasoline. From the secondary re-action chamber 24, the vapors pass through the high temperature condensing chamber 29 and the lighter fractions 80, then finally through the ordinary condenser, which also receives the vapors from the crude oil vessel 1.

The pressure within the system is maintained at from 175 to 200 lbs. and the pump 4 exerts a sufficient pressure to overcome the pressure within the system and introduces the oil coming from the crude oil vessel 1 into the vaporizing and cracking chamber 8.

The described repetition of my cracking treatments, the same being interrupted by a cooling or coolings, is found to be far more effective than a continuous application of cracking heat. The reabsorption of unduly light products, and the revolatilization of heavy products is favorable to a maximum yield of desired fractions marketable as gasoline; and the steam generated in the jacket of my cooling chamber is moreover very advantageously used in the evolution of lighter vapors from the crude oil, thereby rendering my process both economical and efficient.

Various changes may be made in the arrangement of the apparatus and in the steps of the process without departing from the spirit of my invention as claimed.

I claim:

1. A process of treating mineral oil, comprising subjecting mineral oil to a preliminary vaporization to separate the lighter products, then subjecting the mineral oil to a cracking temperature, heating the mixed vapors from the mineral oil to approximately the same cracking temperature, cooling the mixed vaporous products sufficiently to condense the heavier fractions thereof, again subjecting the vaporous products uncondensed at the cooler temperature and fractions mixed therewith to a cracking temperature and finally condensing and separately collecting the heavier and lighter distillates, the lighter products from the original mineral oil being led directly into a final condenser separate from that employed for the collection of the heavier products, said lighter products being volatilized by steam generated incidentally to the intermediate cooling of said mixed vaporous products.

2. A process of treating mineral oil, comprising subjecting mineral oil to a preliminary vaporization to separate the lighter products, then subjecting the mineral oil to a cracking temperature, heating the mixed vapors from the mineral oil to approximately the same cracking temperature, cooling the mixed vaporous products sufficiently to condense the heavier fractions thereof, again subjecting the vaporous products uncondensed at the cooler temperature and fractions mixed therewith to a cracking temperature and finally condensing and separately collecting the heavier and lighter distillates, the lighter products from the original mineral oil being led directly into a final condenser separate from that employed for the collecting of the heavier products.

In testimony whereof I have signed my name to this specification.

WILFRED FOURNESS.